V. R. KOONTZ.
ADJUSTING DEVICE FOR CUTTER HEADS.
APPLICATION FILED MAR. 21, 1913.

1,108,514.

Patented Aug. 25, 1914.
3 SHEETS—SHEET 2.

Witnesses

Victor R. Koontz, Inventor,
by C. A. Snow & Co.
Attorneys.

V. R. KOONTZ.
ADJUSTING DEVICE FOR CUTTER HEADS.
APPLICATION FILED MAR. 21, 1913.

1,108,514.

Patented Aug. 25, 1914.

3 SHEETS—SHEET 3.

Victor R. Koontz
Inventor,
by C. A. Snow & Co.
Attorneys.

Witnesses

UNITED STATES PATENT OFFICE.

VICTOR R. KOONTZ, OF WAYNESBORO, PENNSYLVANIA.

ADJUSTING DEVICE FOR CUTTER-HEADS.

1,108,514.  Specification of Letters Patent.  Patented Aug. 25, 1914.

Application filed March 21, 1913. Serial No. 756,038.

*To all whom it may concern:*

Be it known that I, VICTOR R. KOONTZ, a citizen of the United States, residing at Waynesboro, in the county of Franklin and State of Pennsylvania, have invented a new and useful Adjusting Device for Cutter-Heads, of which the following is a specification.

The present invention relates to improvements in adjusting devices for cutter heads, the present device being particularly applicable to the structure or cutter head shown in my U. S. Letters Patent No. 1,072,127, granted September 2, 1913, and one object of the present invention being the provision of a means whereby the tool operating member of the cutter head may be minutely adjusted for its movement, such adjusting device being disposed for ready action upon the exterior or peripheral portion of the main carrying member of the cutter head, and such adjustment being readily observed and under the direct control of the operator at all times.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
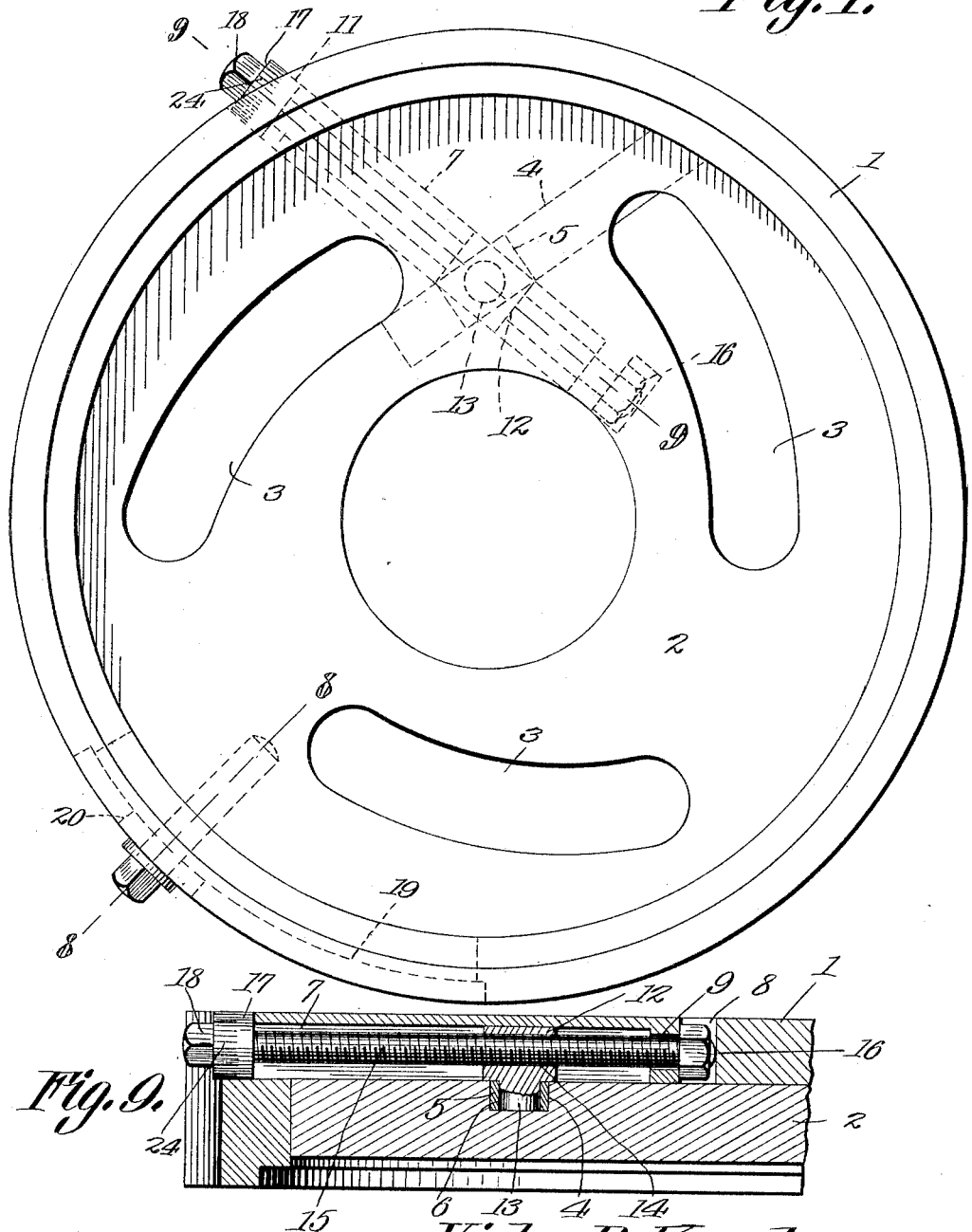
Figure 2:
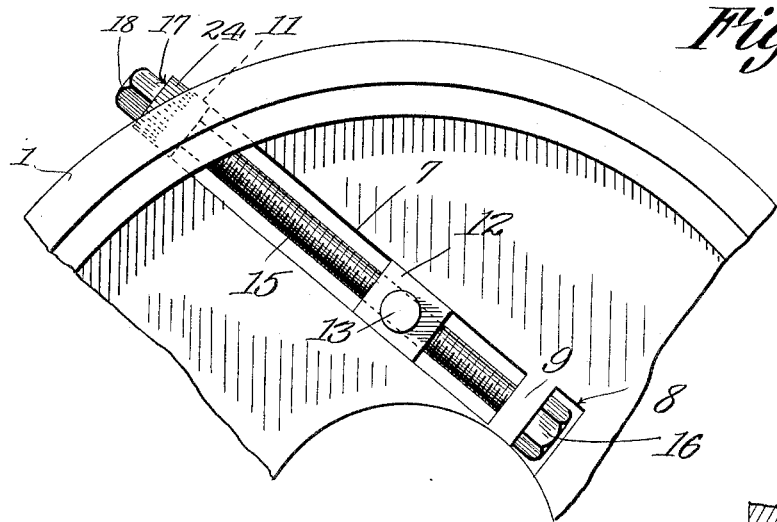
Figure 4:
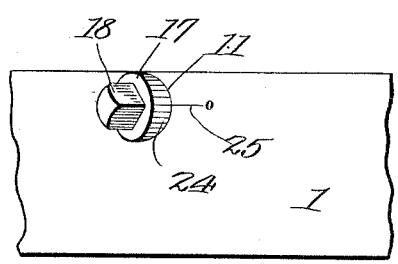
Figure 5:
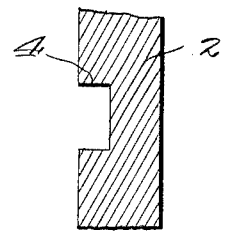
Figure 3:
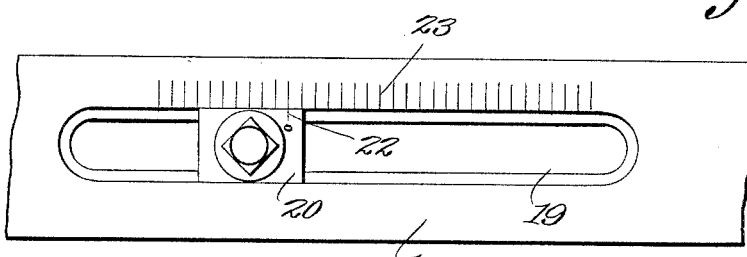
Figure 8:
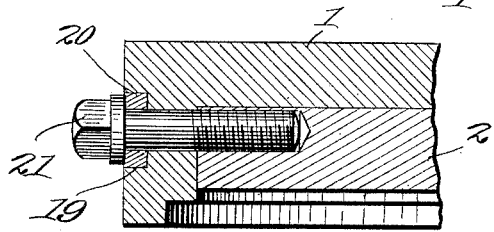
Figure 7:
Figure 6:
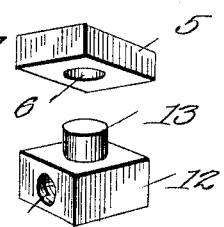
Figures 10, 11:
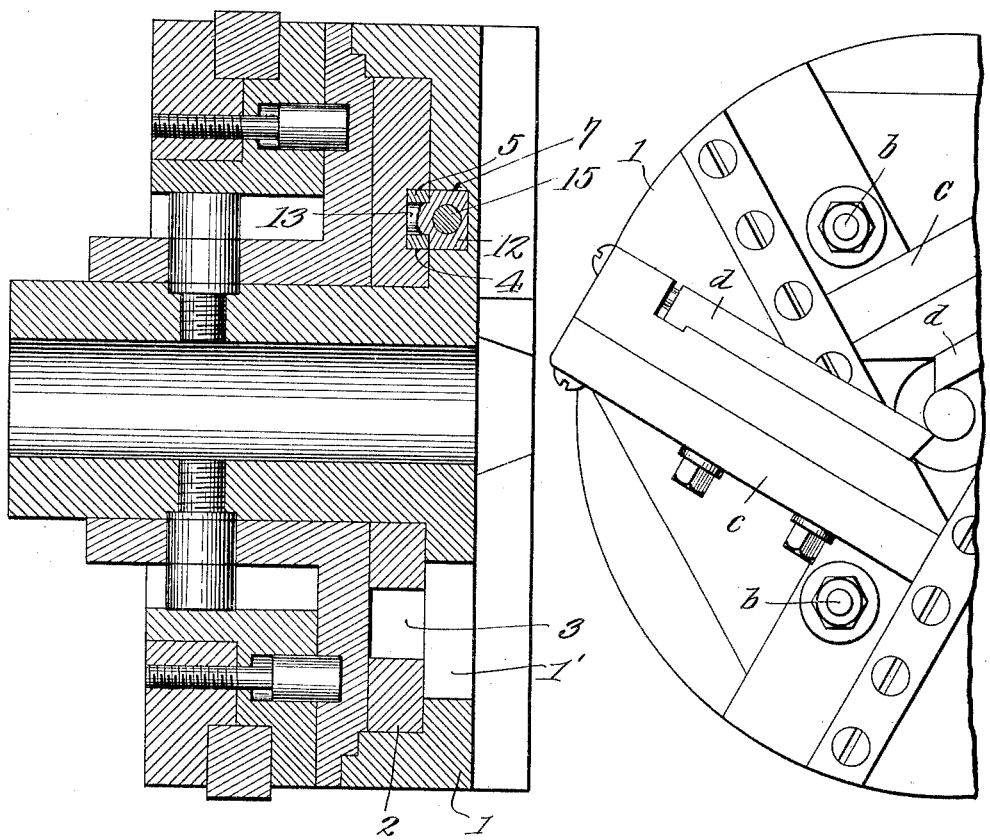

In the drawings: Figure 1 is a plan view of the cutter or tool carrying member minus the tool or cutter carrier, the dotted lines indicating the position of the respective parts of the adjusting device for regulating the said cutter or tool carrying member relatively to the main carrying member of the cutter head. Fig. 2 is a plan view of the carrying member showing the recess within which the main adjusting device is mounted. Fig. 3 shows a portion of the periphery of such member showing the adjusting device for controlling the tool carrying member. Fig. 4 is a similar view showing the present adjusting device at the operating end thereof. Fig. 5 is an enlarged detail view illustrating the recess formed in the tool or cutter carrying member for the reception of the adjusting block. Fig. 6 is a detail view of the member for controlling the adjusting block. Fig. 7 is a detail perspective view of the adjusting block. Fig. 8 is a section taken on line 8—8 of Fig. 1. Fig. 9 is a section taken on line 9—9 of Fig. 1. Fig. 10 is a diametrical section through the complete cutter head of the aforementioned patent with the present invention applied. Fig. 11 is a front elevation of a portion of such cutter head with the cutter or die holders in work engaging position.

Referring to the drawing, the numeral 1 designates the main tool or die holder carrying member which is a flanged disk and has disposed therewithin for oscillatory movement, as will presently appear, the tool controlling disk 2, which as shown is provided with a plurality of eccentrically curved slots 3 for the reception of the inner end of the tool carrying posts or bolts *b*. Upon its outer face is mounted for movement into and out of work engaging position, the tool or die holders *c*, each carrying a tool or die *d*. The slots 3 are so arranged as to cause the movement of the bolt or bolts *b* nearer to or farther from the center of the member 1 to thus limit the movement of the bolts *b* and consequently the cutting end of the tools *d* so that various sized stock may be operated upon.

The disk 2, as clearly shown in Figs. 1 and 5, is provided with an eccentrically disposed recess 4 for the reception of the operating and adjusting block 5, the same being clearly shown in detail in Fig. 7 and being provided with an aperture 6 for the reception of the pin 13 of the operating block 12, the purpose of which will presently appear. Formed eccentrically through the body of the member 1 and extending from a point opening at the center thereof and through the periphery is a recess and bore consisting of the enlarged portion 7, the nut receiving portion 8, and the screw receiving journaling aperture 9, and the controlling head receptacle 11, said receptacle 11 being open through the periphery of the member 1, as clearly shown in Figs. 1 and 4. The block 12, illustrated in Fig. 6, is mounted for sliding movement within the enlarged portion 7 of the recess of the member 1, and is provided with the screw threaded aperture or bore 14 therethrough for the reception of the operating screw 15, said screw 15, as shown in Fig. 1, being journaled in the portions 9 and 10 of the slotted portion of the member 1, and being retained against outward movement by means of the locking nut 16 seated within the recess 8.

Seated within the recess 11 and fast upon the outer end of the screw 7, is a bushing or sleeve 17, which is held in place by means of the shouldered end 18, or both the bushing 17 and shouldered end 18 may be formed integral with the screw 15, the outer periphery of the sleeve or collar 17 being provided with the scale 24, which is disposed to coöperate with the scale 25 carried upon the flange of the member 1 as clearly shown in Fig. 4, so that the screw may be operated and the adjustment of the block 12 controlled thereby, be indicated by such scales, and as the said block 12 is operably connected to the block 5, said block 5 is moved in its slot 4 according to the position of the block 12 upon the screw 15. By this means the disk member 2 is oscillated within the flange portion of the member 1 and according to the desires of the operator. By this means it will be seen that the position of the slot 3 relatively to the post $b$ and the radial slot 1' of the member 1 will be adjusted and thus the consequent throw of the tool or die holder $c$ will be controlled by the simple manipulation of the screw 15 through the shouldered end 18 thereof.

In order to provide a means for locking the tool actuating disk 2 relatively to the carrying member 1, the rim of the carrying member as shown in Fig. 3, is slotted circumferentially as at 19, for the reception of the clamping block 20, by the means of the screw 21 which projects through the block and engages the tool actuating plate, Fig. 8. The scale 22 is carried by the block 20 and its coacting scale 23 is carried by the rim or flange of the member 1 so that the adjustment of the block 20 relatively to the flange of the member 1 may be regulated to an exactness and indicated by the gage or scale as herein shown.

What is claimed is:

1. A cutter head, including a die carrier actuating disk, said disk being provided with a tangentially disposed recess extending from a point near its center to its periphery, a block slidably mounted in said recess, a supporting disk for the actuating disk and in which said actuating disk is mounted for oscillatory movement, and a screw journaled tangentially within the last disk and in angular relation to the recess of the first disk for operating the block to adjust the carrier disk relatively to the supporting disk.

2. A cutter head, including a die carrier actuating disk, said disk being provided with a recess extending from a point near its center to its periphery, a block slidably mounted in said recess and projecting beyond the face of the disk, a supporting disk for the actuating disk and in which said actuating disk is mounted for oscillatory movement, and a screw journaled within the last disk and embracing the projecting portion of the block, whereby as the screw is rotated, the die carrier is moved relatively to the supporting disk.

In testimony that I claim the foregoing as my own, I have hereto affixed my signature in the presence of two witnesses.

VICTOR R. KOONTZ.

Witnesses:
S. G. CUNNINGHAM,
T. S. CUNNINGHAM.

---

Copies of this patent may be obtained for five cents each, by addressing the "Commissioner of Patents, Washington, D. C."